United States Patent Office 3,162,284
Patented Dec. 22, 1964

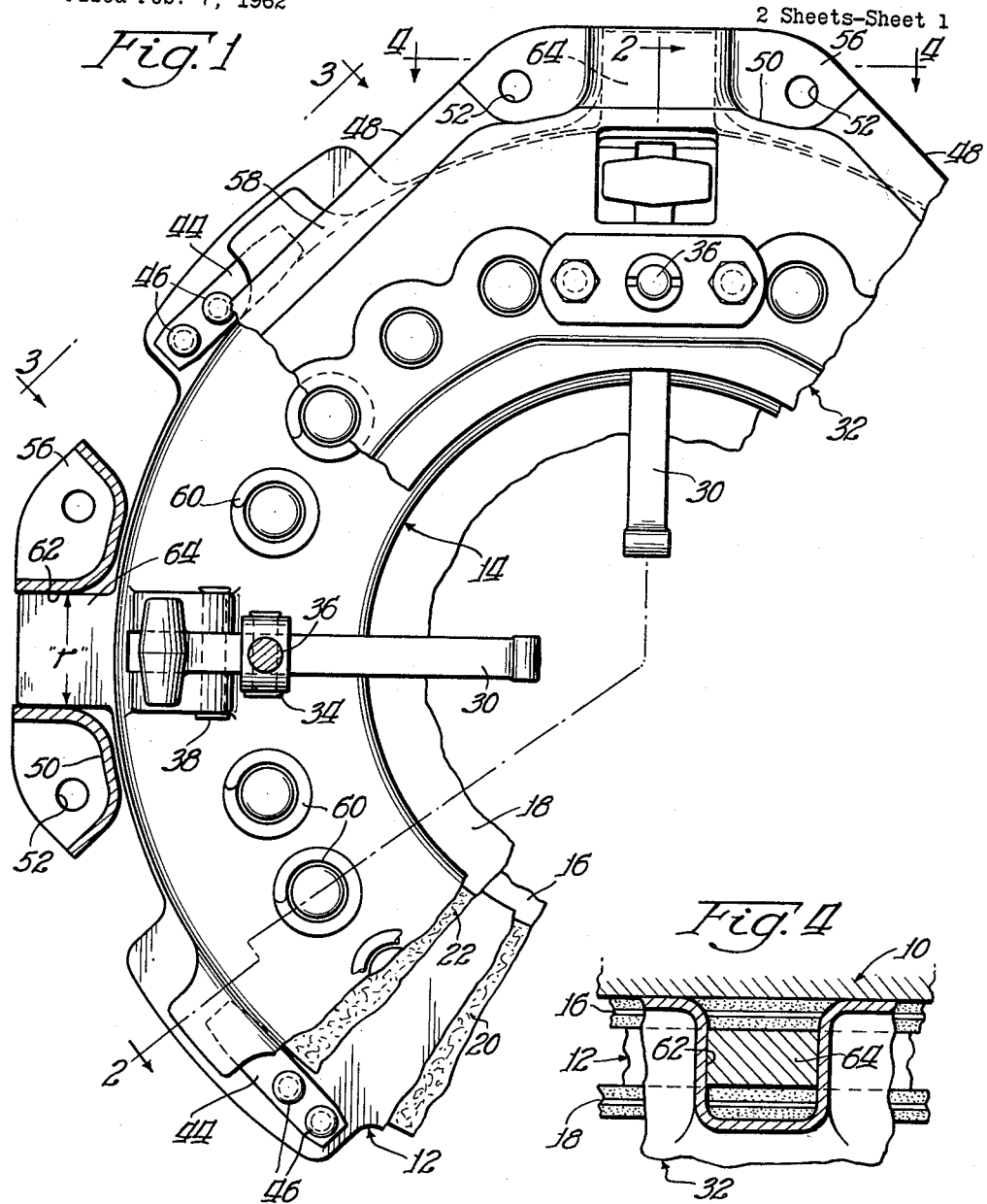

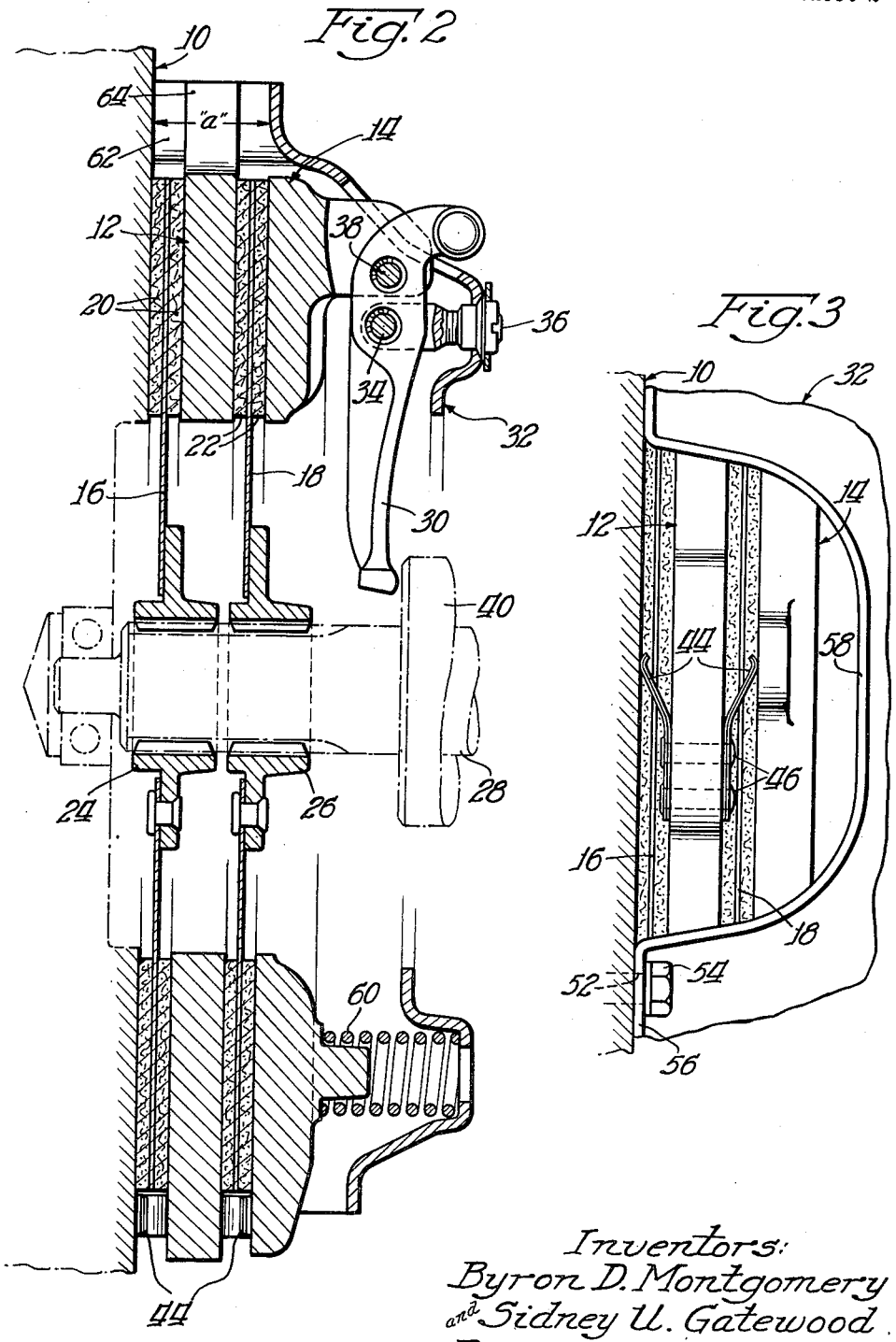

3,162,284
MULTIPLE DISC CLUTCH WITH SHEET
METAL COVER
Byron D. Montgomery, Birmingham, and Sidney U. Gatewood, Roseville, Mich., assignors to Borg-Warner Corporation, Chicago, Ill., a corporation of Illinois
Filed Feb. 7, 1962, Ser. No. 171,730
2 Claims. (Cl. 192—69)

This invention relates to a clutch cover plate and more particularly to a clutch cover plate adapted to be used with a multiple disc clutch.

Prior to this invention it has been known that cover plates for single disc clutches could be stamped from blanks without substantial thinning and weakening of the metal. For example, a stamped cover plate for a single disc clutch was shown in United States Patent 2,079,888, Wemp.

A multiple disc clutch utilizes a forward driven member packed between the engine flywheel and a first pressure ring, and a rearward driven member packed between the first pressure ring and a second pressure ring. Various means have been employed to secure the pressure rings together such that the pressure rings rotate along with the flywheel. Due to the axial depth of the clutch (the depth from the outer surface of the clutch cover plate to the flywheel) multiple disc clutch cover plates heretofore made were either cast such that they extended from the flywheel to encompass the clutch assembly or were stamped such that the cover plate did not encompass the entire clutch assembly (see for example U.S. Patent 2,036,005, Wemp). It has long been known that stamping of metal results in weakening of the surface and that deep drawing creates greater danger of stress cracks due to thinning of the metal. A problem existed in attempting to provide a stamped metal cover plate for a multiple disc clutch assembly in that there was believed to be no satisfactory means for driving the intermediate pressure rings except by a separate drive system such as, for example, as shown in 2,036,005, Wemp.

Briefly described, this invention relates to a sheet metal stamping structure with an axially drawn dimension such that the sheet metal stamping extends from the outer extremities of the clutch to the flywheel and encompasses the complete multiple disc clutch assembly. This sheet metal stamping is further characterized as having a pressure plate drive lug recess formed therein as part of the stamping such that the intermediate pressure ring is free to move axially and is rotated along with the cover plate.

Other features, objects and advantages of the invention will appear from the following detailed description of a preferred embodiment of the invention. In the drawing illustrating said embodiment:

FIGURE 1 is a rear view, partially in cross section, of the clutch with part of the clutch cut away;
FIGURE 2 is a sectional view of the clutch taken along section lines 2—2 of FIGURE 1;
FIGURE 3 is a fragmentary sectional view taken along section lines 3—3 of FIGURE 1; and
FIGURE 4 is a fragmentary sectional view taken along section lines 4—4 of FIGURE 1.

The driving member of the clutch may comprise an engine flywheel 10, a first pressure ring 12, and a second pressure ring or pressure plate 14. A first driven disc 16 is positioned intermediate the flywheel 10 and the first pressure ring 12 and a second driven disc 18 is positioned intermediate the pressure ring 12 and the pressure plate 14. The first driven disc 16 is provided with a first facing material 20 and the second driven disc 18 is provided with a second facing material 22. The first driven disc 16 is provided with a first hub 24 and the second driven disc 18 is provided with a second hub 26 each of which hubs 24 and 26 are mounted on a driven shaft 28 by way of a splined connection such that the hubs 24 and 26 are free to move axially with respect to each other and with respect to the driven shaft 28 and such that the hubs 24 and 26 provide a means to rotate the driven shaft 28.

Clutch release levers 30 are pivoted as at pivots 34 on studs 36 which studs 36 are supported on the cover plate 32. The release levers 30 are pivotally connected as at pressure plate pivot 38 to the pressure plate 14. A reciprocable clutch throw-out member 40 is mounted on the driven shaft 28 such that the throw-out member may be shifted axially with respect to the driven shaft 28 to rock the release levers 30 on their pivots 34. This lever arrangement in combination with the pressure springs 60 enables the clutch to be engaged or disengaged.

FIGURE 3 illustrates a means for separating the pressure ring 12 and the pressure plate 14 from the first facing material 20 and the second facing material 22 when the clutch is disengaged. Flat springs 44 may be secured as by rivets 46 to the pressure ring 12. These springs are shaped to react against the flywheel 10 and against the pressure plate 14 to maintain the pressure ring 12 midway between the pressure plate 14 and the flywheel 10.

The clutch cover plate of the present invention is stamped from a sheet metal blank and is of a polygonal configuration such as, for example, with four leg portions which are secured to the flywheel at four spaced points. The invention, however, is not limited to a cover plate having four legs since the number of legs may be varied to less than or to more than four without departing from the spirit and intent of the invention.

Referring now to FIGURE 1 it will be noted the cover plate 32 is of a polygonal configuration with chordal portions 48 separated by leg portions 50. The leg portions 50 extend axially inwardly and the terminal end of each leg portion terminates in a radially extending flange 56 which flange is provided with spaced apart holes 52 for attachment of the cover plate to the flywheel 10 as by stud bolts 54 (FIGURE 3).

Referring now to FIGURE 3 it will be noted that the cover plate has arcuate portions 58 formed therein. The arcuate portions 58 expose the pressure plates and provide for ventilation and for heat dissipation. This particular configuration eliminates the requirement of providing ventilation apertures in the cover plate. The arcuate portions increase the structural strength of the stamping and thus minimize flexing of the cover plate caused by pressure of the springs 60 and by pressure exerted on the cover by the clutch release levers 30 in compressing the springs 60.

The leg portion 50 of the clutch cover has formed therein pressure plate drive lug recesses 62 which confine drive lugs 64 of the intermediate pressure ring 12. The dimension "r" (FIGURE 1) is slightly in excess of the width of the drive lug 64. The axial depth "a" (FIGURE 2), however, is considerably in excess of the thickness of the drive lug 64 in that the axial depth must be sufficient to allow free axial movement of the drive lug 64 with respect to the clutch cover. This pressure plate drive lug recess 62 is positioned within the leg portion so as to provide a rib in the leg portion 50 to increase the structural strength of the stamping as well as to provide a means of confining and driving the pressure ring 12.

This clutch cover (compared to other clutch covers that completely enclose a multiple disc clutch) is relatively inexpensive in that it requires inexpensive stamping stock and it requires an inexpensive manufacturing operation (stamping). This clutch cover (compared to other stamped clutch covers) for the first time provides a stamped clutch cover to encompass the entire clutch assembly while simultaneously providing an unusually rigid cover plate that has sufficient structural strength to drive and to actuate the multiple disc clutch assembly.

While this invention has been described in detail with respect to certain embodiments, it will be apparent to those skilled in the art that various changes and modifications thereof may be made without departing from the spirit and intent of the invention.

The invention having been described, what is here claimed is:

1. A multiple disc clutch comprising in combination a driving member; a pressure plate; a pressure ring having drive lugs thereon; a first driven disc interposed between said driving member and said pressure ring; a second driven disc interposed between said pressure ring and said pressure plate; pressure spring members acting on said pressure plate to pack said pressure plate, said second driven disc, said pressure ring, and said first driven disc against said driving member; a stamped sheet metal clutch cover plate having an axial depth sufficient to extend from said driving member to encompass said multiple disc clutch; a rear portion formed on said clutch cover plate; clutch release levers pivotally supported on said cover plate; means to support said pressure springs; a plurality of leg portions extending from said rear portion toward said driving member, each of said leg portions including an outwardly flared flange portion adapted to engage said driving member and a radially flared drive lug recess extending substantially perpendicular to said leg portion and extending from a point near said rear portion to a point near said driving member, said radially flared drive lug recess providing substantial radial and substantial axial support defining a driving surface for said drive lugs whereby the radially flared drive lug recess increases the structural strength of said clutch cover plate.

2. An apparatus in accordance with claim 1 wherein the area of said driving surface is substantially greater than the cross-sectional area of said drive lug recess.

References Cited in the file of this patent
UNITED STATES PATENTS

| | | |
|---|---|---|
| 1,665,554 | Kolb | Apr. 10, 1928 |
| 1,848,843 | Ruesenberg | Mar. 8, 1932 |
| 2,036,005 | Wemp | Mar. 31, 1936 |
| 2,256,708 | Geyer et al. | Sept. 23, 1941 |
| 2,597,356 | Maurice | May 20, 1952 |
| 2,600,520 | Spase | June 17, 1952 |
| 3,017,003 | Reed | Jan. 16, 1962 |